United States Patent [19]

Leigh-Monstevens et al.

[11] Patent Number: 4,566,578
[45] Date of Patent: Jan. 28, 1986

[54] CLUTCH THROW-OUT BEARING AND BEARING CARRIER ASSEMBLY

[75] Inventors: Keith V. Leigh-Monstevens, Troy; David L. Wrobleski, Fraser, both of Mich.

[73] Assignee: Automotive Products plc, Warwickshire, England

[21] Appl. No.: 616,713

[22] Filed: Jun. 4, 1984

[51] Int. Cl.<sup>4</sup> ............................................. F16D 19/00
[52] U.S. Cl. ................................... 192/98; 192/110 B; 384/617
[58] Field of Search ............. 192/98, 110 B; 384/539, 384/611, 617, 903

[56] References Cited

U.S. PATENT DOCUMENTS 4,243,130 1/1981 Vinel et al. ............................. 192/98
4,467,904 8/1984 Renaud .................................. 192/98
4,482,041 11/1984 Ladin ............................... 192/110 B Primary Examiner—Stephen F. Husar
Attorney, Agent, or Firm—Hauke and Patalidis

[57] ABSTRACT

A clutch release bearing and bearing carrier assembly comprising a support flange proximate an end of the carrier member, and a pair of resiliently flexible lugs on the bearing housing face in engagement with the carrier flange disposed each in a pocket formed in the peripheral surface of the carrier proximate the flange such as to retain the bearing in assembly with the carrier while permitting limited radial motion of the bearing relative to the carrier for self-alignment, and preventing rotational motion of the bearing housing relative to the carrier. An elastomeric cushion is preferably disposed on the surface of the carrier flange for permitting limited angular axial alignment of the bearing with the axis of rotation of the clutch.

18 Claims, 4 Drawing Figures

U.S. Patent   Jan. 28, 1986   Sheet 1 of 2   4,566,578

CLUTCH THROW-OUT BEARING AND BEARING CARRIER ASSEMBLY

BACKGROUND OF THE INVENTION

The present invention relates to a clutch release or throw-out bearing and bearing carrier assembly.

Mechanical disk clutches used in motor vehicles for controllably coupling the motor vehicle engine flywheel to the gearbox input shaft are normally biased to engagement by spring means, such as for example a diaphragm spring provided with fingers engaged at their end with the revolving race of a release bearing, or throw-out bearing, the non-revolving race of the bearing being supported by a tubular sleeve or carrier. The sleeve or carrier is slidably mounted over a tubular member concentrically disposed around the driveshaft.

The revolving race of the release bearing, or throw-out bearing, is constantly engaged with the end of the clutch release fingers, even during clutch engagement. As long as the clutch is engaged, a relatively weak spring bias causes engagement of the throw-out bearing revolving race with the end of the clutch release fingers. The clutch is disengaged as a result of axial displacement of the throw-out bearing and bearing carrier assembly, which is effected by appropriate control means causing displacement of the bearing carrier and throw-out bearing in the direction that releases the clutch, with an accompanying considerable increase of the pressure exerted by the clutch release fingers upon the throw-out bearing. Controlled displacement of the bearing carrier and throw-out bearing assembly is effected by a mechanical clutch control fork lever, operated by the clutch pedal or a hydraulic actuator, or directly by a hydraulic actuator operated from a master cylinder in turn operated by the clutch pedal.

Whether the throw-out bearing and bearing carrier assembly is mechanically actuated or hydraulically actuated, it is desirable that the throw-out bearing be supported by the bearing carrier in such manner as to be able to float, to a certain amount, radially for self-alignment of the axis of rotation of the revolving race with the axis of rotation of the clutch. In view of the constant spring bias exerted upon the bearing after installation in a motor vehicle, the coupling between the bearing and the bearing carrier needs only to hold the bearing onto the carrier, prior to and during assembly on a motor vehicle in such manner that the bearing does not become accidentally separated from the carrier.

SUMMARY OF THE INVENTION

The present invention has for principal object to provide a clutch release bearing, or throw-out bearing, and bearing carrier assembly maintaining the bearing coupled to the carrier such that the two components do not become accidentally separated prior to installing on a motor vehicle. In addition, the present invention provides such a floating coupling between the bearing and the bearing carrier while preventing the bearing non-revolving race from rotating relative to the carrier.

These and other objects of the invention will become apparent to those skilled in the art when the following description of the best modes contemplated at the present is read in conjunction with the accompanying drawing wherein like reference numerals refer to like or equivalent parts, and in which:

DETAILED DESCRIPTION OF THE PREFERRED EMBODIMENT

Figure 1:
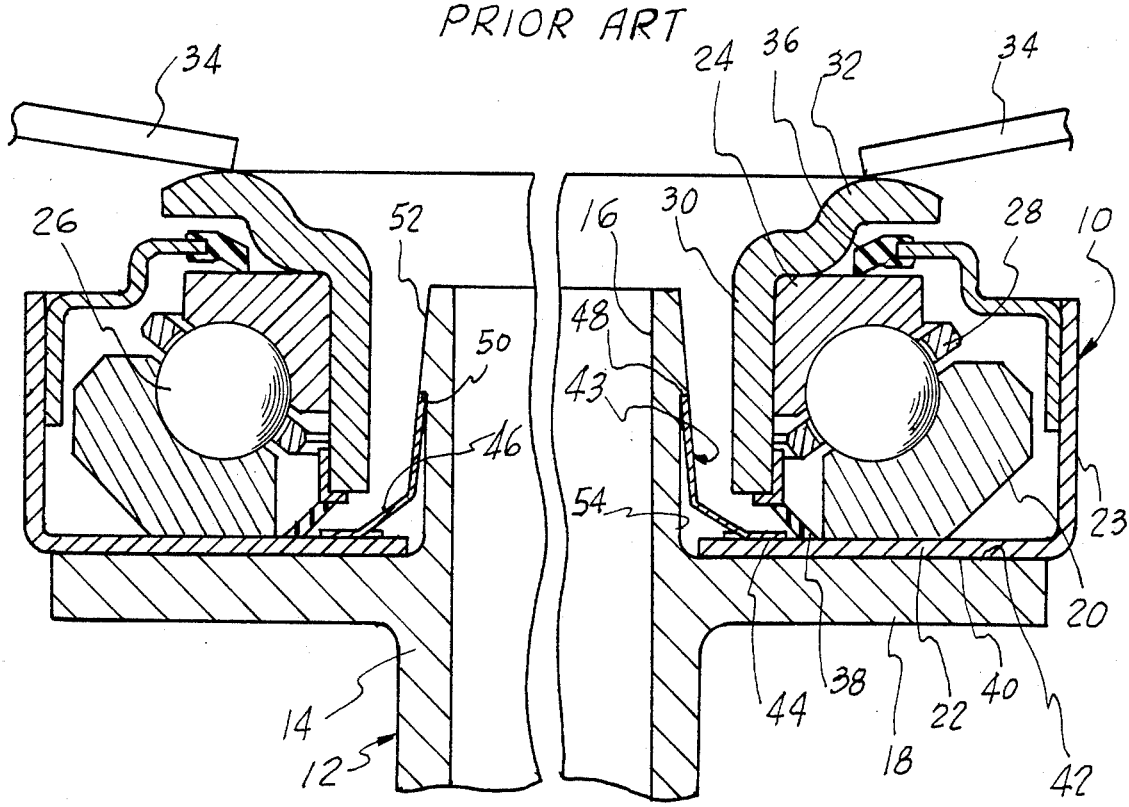
FIG. 1 is a partial longitudinal section of a clutch release, or throw-out bearing, and bearing carrier assembly according to the prior art.

Referring to FIG. 1 of the drawing, a clutch release bearing 10 is illustrated mounted on a bearing carrier 12, a portion of which is only shown. The bearing carrier 12 is in the form of a tubular or sleeve body member 14, made of metal or plastic, having a central bore 16 and which is disposed concentric to and slidable over a stationary tubular member, or quill, not shown, which is made integral or attached to, for example, the end plate of a motor vehicle gearbox, the gearbox input shaft, also not shown, being disposed co-axially within the tubular member and therefore within the central bore 16 of the bearing carrier 12. The bearing carrier 12 is longitudinally displaceable by a control fork, not shown, mechanically connected to a clutch pedal or, in the alternative, it may be actuated by the output member of a hydraulic slave cylinder, as described in detail, for example, in application Ser. Nos. 477,161, 477,162, 477,159 and 477,160, all filed Mar. 31, 1983 and all assigned to the same assignee as the present application.

The carrier 12 supports on one end the clutch release, or throw-out, bearing 10 through the intermediary of a radially extending flange 18 formed integral with the sleeve body member 14. The throw-out bearing 10 is a thrust ball bearing comprising a first or non-revolving race 20 which may be fastened, such as by welding or brazing, on the inside surface of the rear wall 22 of an annular housing 23, substantially U-shaped in longitudinal section and a second or revolving race 24, a plurality of steel balls 26 in an annular cage 28 being disposed between the non-revolving race 20 and the revolving race 24, as is well known in the art. A generally L-shaped annular member 30 is fastened to the revolving race 24, as illustrated, such as by welding or brazing, and is provided with an integral exteriorly rounded flange portion or spacer 32 constantly engaged with the end of the clutch release spring fingers 34. Appropriate annular seals 36 and 38 are supported respectively from the edge of the housing 22 and of the L-shaped annular member 30 to isolate the interior of the bearing 10 from the ambient, such as to prevent entrance of dirt therein and escape of the lubricant packing the interior of the bearing 10. The bearing 10 is generally of the type disclosed in application Ser. No. 585,123, filed Mar. 1, 1984, and assigned to the same assignee as the present application.

The carrier 12 is constantly biased toward the clutch release fingers 34 due to the slight spring pressure caused by return springs, not shown, forming part of the clutch release mechanism with the result that the clutch release fingers 34 are applied against the front surface of the spacer 32 and the rear surface 40 of the bearing housing rear wall 22 is constantly applied against the surface 42 of the carrier flange. It is evident that when the bearing carrier 12 is displaced longitudinally, either by actuation of the clutch release fork or by actuation of the clutch release hydraulic slave cylinder, the clutch release fingers 34 are deflected, and the clutch is disengaged, as is well known in the art. After installation of the assembly formed by the bearing 10 and the bearing carrier 12 in a motor vehicle, the bearing 10 requires no separate means for mounting on the face 40 of the carrier flange 18. However, it is convenient to couple the bearing 10 to the carrier 12 such that the bearing and the carrier do not separate prior to installation on a motor vehicle.

Figure 2:
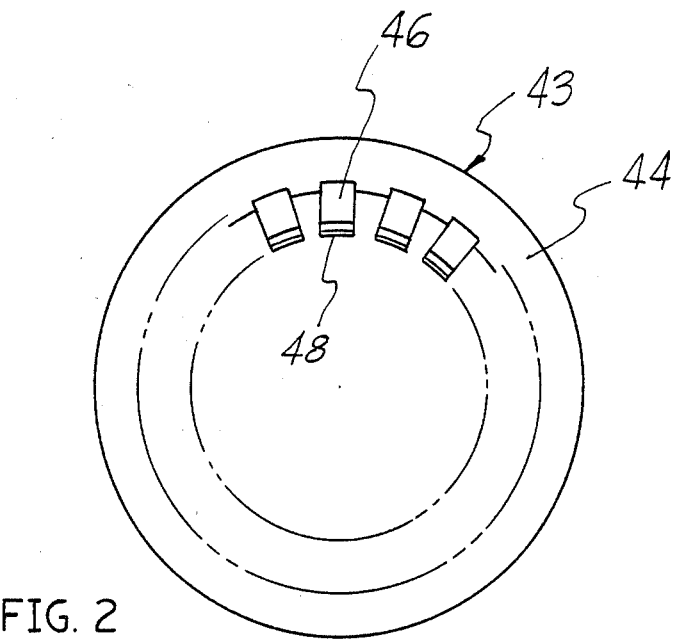
FIG. 2 is an end view of a bearing retainer member, also according to the prior art.

The prior art known to applicants effectuates such a coupling between the bearing 10 and the carrier 12 by means of an annular spring retainer 43 shown in detail at FIG. 2. The annular spring retainer 43 comprises a flange portion 44 and a plurality of radially and outwardly extending, resiliently deflective lugs 46 integrally attached at their root to the flange portion 44. Each lug 46 is generally L-shaped with its free end 48 engaged with a shoulder abutment 50, FIG. 1, rearwardly disposed, formed on the periphery of the sleeve body member 14 proximate the end thereof between a frusto-conical ramp portion 52 and a peripherally recessed portion 54. During assembly of the bearing 10 against the face 42 of the carrier flange 18, the annular spring retainer 43 is pushed into the position illustrated at FIG. 1, the frusto-conical end portion 52 of the sleeve body member 14 having elastically spread apart the lugs 46 until the retainer flange portion 44 engages the interior surface of the rear wall 22 of the bearing housing 20 causing the rear wall face 40 to engage the face 42 of the carrier flange 18, at which time the lugs 46 elastically snap into the peripherally recessed portion 54 of the carrier sleeve member 14 with their ends 48 abutting against the shoulder 50.

Means, not shown, are provided for preventing the housing 22 of the bearing 10 from rotating relative to the carrier 12. Conventionally, such means may consist of radial ridges provided on the face 42 of the carrier flange 18 engaged within radial grooves formed in the face 40 of the bearing housing rear wall 22.

Figure 4:
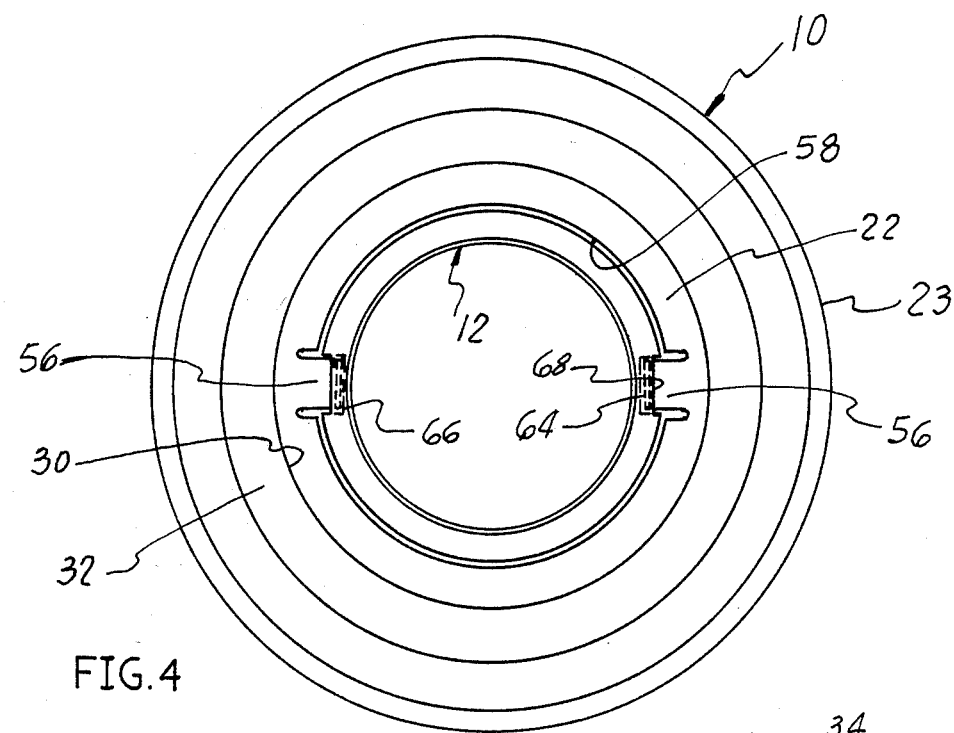
FIG. 4 is an end view thereof from line 4—4 of FIG. 3.
Figure 3:
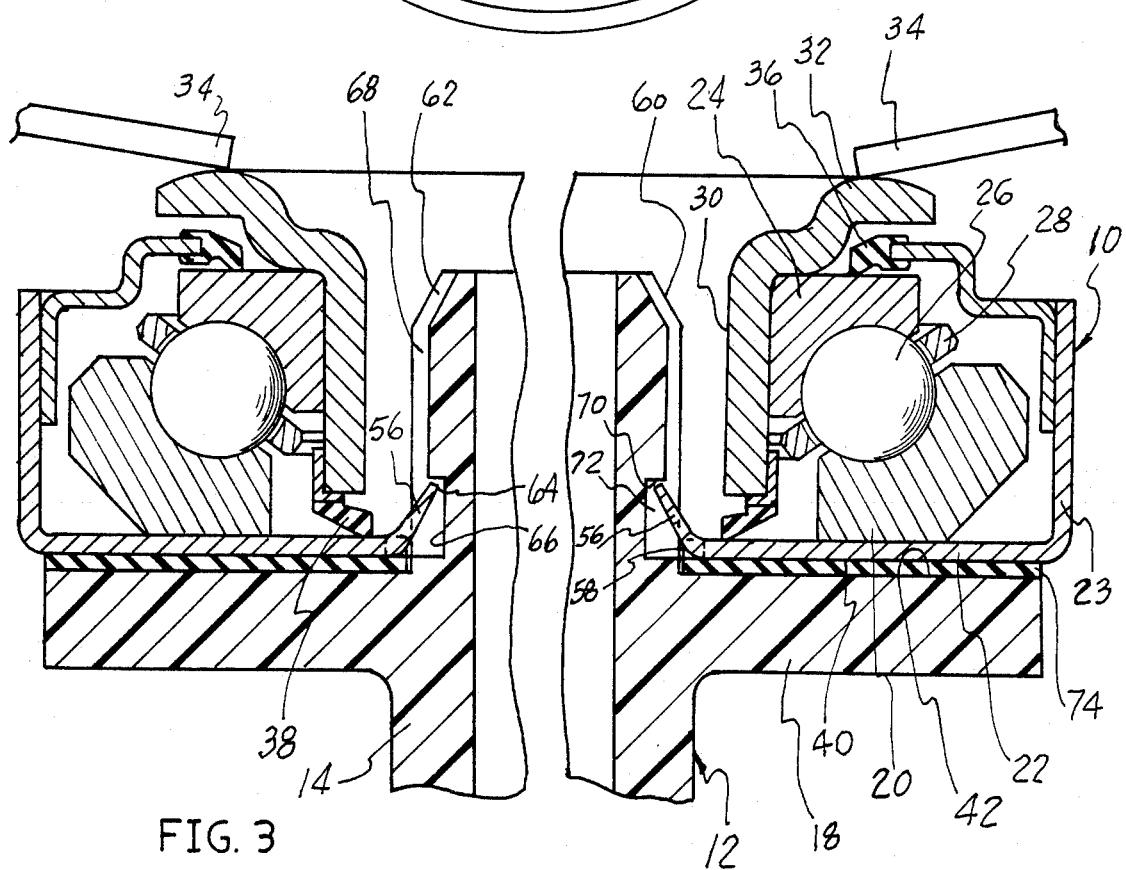
FIG. 3 is a view similar to FIG. 1, but showing an example of clutch release, or throw-out, bearing and bearing carrier assembly according to the present invention.

As illustrated at FIGS. 3-4, the improvement of the invention is accomplished by providing the rear wall 22 of the housing 23 of the bearing 10 with a pair of diametrically opposed bent-over lugs 56 fulfilling the double function of retaining the bearing 10 in assembly with the bearing carrier 12 and preventing the housing 23 of the bearing 10, and consequently the non-revolving race 20 from rotating relative to the carrier 12. The lugs 56 are formed integrally at the inner edge 58 of the bearing housing rear wall 22. The carrier sleeve body member 14 has a frusto-conical portion 60 provided with a groove 62 acting as a guide means for the lateral edges of each lug 56 when the bearing 10 is installed on the bearing carrier 12, the bottom of the groove 52 in the frusto-conical portion 60 elastically deflecting the lugs 56 until the tip 64 of each lug 56, due to the lug springing back to its original position, drops in a pocket 66 formed in the peripheral surface of the carrier sleeve body member 14 proximate the flange 18. A longitudinal groove 68 formed on the peripheral surface of the carrier sleeve body member 14 and connecting with the groove 62 in the frusto-conical portion 60 guides the lug 56 from the groove 62 to the pocket 66. Once the lugs 56 are disposed each in a pocket 66, the end wall 70 of the pocket performs as an abutment interfering with the tip 64 of the lugs 56, thus preventing separation of the bearing 10 from the bearing carrier 12 and one of the sidewalls 72 of the pocket 66 acts as a lateral abutment preventing the bearing housing 23 from rotating relative to the bearing carrier 12. The bearing carrier 12 is in turn held against rotation by the clutch release fork lever or, in structures wherein the bearing carrier 12 is actuated by an annular slave cylinder, the carrier is held against rotation by appropriate means forming part of the slave cylinder structure.

The tip 64 of the lugs 56, when springing back to its relaxed shape, is disposed a short distance from the bottom of the pocket 66 such as to prevent binding. Preferably, the face 40 of the carrier flange 18 is provided with an elastomeric cushion 74, made of, for example, elastomeric polyurethane, elastomeric polybutadiene, elastomeric polyester or polyether, styrene elastomer copolymer, polyisoprene, or polyolefin. The elastomeric cushion 74 permits the end wall 22 of the bearing housing 23 to align itself non-parallel to the carrier flange 18, up to a limit depending from the compressibility of the material of which the elastomeric cushion 74 is made, by compressing the elastomeric cushion 74 non-uniformly along a radial direction, such that the axis of rotation of the revolving race 24 may angularly align itself with the axis of the clutch assembly.

The bearing non-rotating race 20 is only frictionally engaged with the interior surface of the housing end wall 22, thus permitting the axis of rotation of the revolving race 24 to align itself with the axis of rotation of the clutch. Under normal operation, after the non-revolving race 20 has been laterally displaced to a position providing such alignment of the axes of rotation of the revolving race 24 and of the clutch assembly, the position of the non-revolving race 20 remains constantly the same.

Although the invention has been disclosed as comprising a pair of retaining lugs 56, it will be readily appreciated by those skilled in the art that more than two lugs may be provided together with one pocket 66 in the bearing carrier 12 for each lug 56.

Having thus described the present invention by way of an example of structure well designed to accomplish the objects of the invention, modification whereof will be apparent to those skilled in the art, what is claimed as new is as follows:

1. A clutch release bearing and bearing carrier assembly comprising a carrier member in the form of a tubular sleeve member, a radial flange proximate an end of said tubular sleeve member, and a bearing member having a housing rear wall supporting a race of said bearing member, said housing rear wall having a radially and angularly projecting lug, said sleeve body member having a frusto-conical end portion for elastically deflecting said lug when said bearing member is pressed onto the end of said sleeve body member, and a pocket formed in the peripheral surface of said sleeve body member having an abutment for engagement by said lug when said bearing housing rear wall engages said flange.

2. The assembly of claim 1 wherein said lugs engage in said pockets with limited radial clearance.

3. The assembly of claim 1 further comprising an elastomeric cushion disposed between said bearing housing rear wall and said flange for allowing limited angular alignment of the axis of rotation of said bearing.

4. The assembly of claim 2 further comprising an elastomeric cushion disposed between said bearing housing.

5. The assembly of claim 1 wherein each of said lugs laterally engages a lateral wall of said pocket whereby said bearing housing rear wall is held against rotation relative to said carrier member.

6. The assembly of claim 2 wherein each of said lugs laterally engages a lateral wall of said pocket whereby said bearing housing rear wall is held against rotation relative to said carrier member.

7. The assembly of claim 3 wherein each of said lugs laterally engages a lateral wall of said pocket whereby said bearing housing rear wall is held against rotation relative to said carrier member.

8. The assembly of claim 4 wherein each of said lugs laterally engages a lateral wall of said pocket whereby said bearing housing rear wall is held against rotation relative to said carrier member.

9. The assembly of claim 5 wherein each of said lugs laterally engages a lateral wall of said pocket whereby said bearing housing rear wall is held against rotation relative to said carrier member.

10. The assembly of claim 1 further comprising a longitudinal groove on the periphery of said bearing carrier leading to each of said pockets for guiding each of said lugs during assembly of said bearing on said bearing carrier.

11. The assembly of claim 2 further comprising a longitudinal groove on the periphery of said bearing carrier leading to each of said pockets for guiding each of said lugs during assembly of said bearing on said bearing carrier.

12. The assembly of claim 3 further comprising a longitudinal groove on the periphery of said bearing carrier leading to each of said pockets for guiding each of said lugs during assembly of said bearing on said bearing carrier.

13. The assembly of claim 4 further comprising a longitudinal groove on the periphery of said bearing carrier leading to each of said pockets for guiding each of said lugs during assembly of said bearing on said bearing carrier.

14. The assembly of claim 5 further comprising a longitudinal groove on the periphery of said bearing carrier leading to each of said pockets for guiding each of said lugs during assembly of said bearing on said bearing carrier.

15. The assembly of claim 6 further comprising a longitudinal groove on the periphery of said bearing carrier leading to each of said pockets for guiding each of said lugs during assembly of said bearing on said bearing carrier.

16. The assembly of claim 7 further comprising a longitudinal groove on the periphery of said bearing carrier leading to each of said pockets for guiding each of said lugs during assembly of said bearing on said bearing carrier.

17. The assembly of claim 8 further comprising a longitudinal groove on the periphery of said bearing carrier leading to each of said pockets for guiding each of said lugs during assembly of said bearing on said bearing carrier.

18. The assembly of claim 9 further comprising a longitudinal groove on the periphery of said bearing carrier leading to each of said pockets for guiding each of said lugs during assembly of said bearing on said bearing carrier.

* * * * *